US008886231B2

(12) United States Patent
Estermann et al.

(10) Patent No.: US 8,886,231 B2
(45) Date of Patent: Nov. 11, 2014

(54) METHOD FOR CARRYING OUT MOBILE COMMUNICATION BY MARKING IMAGE OBJECTS, AND MOBILE UNIT AND COMMUNICATIONS DEVICE

(75) Inventors: Colin Estermann, Gräfelfing (DE); Hubert Jäger, Pullach (DE); Robert Kutka, Geltendorf (DE); Christian Winkler, München (DE)

(73) Assignee: Siemens Aktiengesellschaft, Munich (DE)

( * ) Notice: Subject to any disclaimer, the term of this patent is extended or adjusted under 35 U.S.C. 154(b) by 1454 days.

(21) Appl. No.: 11/885,631

(22) PCT Filed: Feb. 28, 2006

(86) PCT No.: PCT/EP2006/060327
§ 371 (c)(1),
(2), (4) Date: Sep. 4, 2007

(87) PCT Pub. No.: WO2006/092394
PCT Pub. Date: Sep. 8, 2006

(65) Prior Publication Data
US 2008/0167053 A1    Jul. 10, 2008

(30) Foreign Application Priority Data

Mar. 4, 2005  (DE) .......................... 10 2005 010 030

(51) Int. Cl.
*H04W 24/00*   (2009.01)
*H04W 64/00*   (2009.01)

(52) U.S. Cl.
CPC .................................... *H04W 64/00* (2013.01)
USPC ........ 455/457; 455/411; 455/456.3; 455/415; 455/422

(58) Field of Classification Search
CPC ......... H04L 67/22; H04W 4/02; H04W 4/023
USPC ................ 345/419, 415; 379/142.01, 142.17; 455/415, 422, 411, 414.1, 457, 456.3; 342/357.31, 357; 701/208, 213; 382/276; 358/118
See application file for complete search history.

(56) References Cited

U.S. PATENT DOCUMENTS 6,452,544 B1 * 9/2002 Hakala et al. ............ 342/357.31
7,171,029 B2 * 1/2007 Rowe ............................. 382/118
(Continued)

FOREIGN PATENT DOCUMENTS

DE    102 14 935 A1    10/2003
DE    103 56 090 B3    4/2005
(Continued)

OTHER PUBLICATIONS

Keiichi Kato, Image Information Management and Printing System Gazo Joho Kanri Insatsu Shisutemu United States Patent and Trademark Office Washington, D.C. Jul. 2011 Translated by Schreiber Translations, Inc.*

(Continued)

*Primary Examiner* — Joseph Arevalo
(74) *Attorney, Agent, or Firm* — Staas & Halsey LLP

(57) ABSTRACT

A method carries out mobile communication between a mobile unit and a communications device, which exchange voice messages using a telecommunications protocol. During the method, at least one image can be generated by the mobile unit. In the event that at least one image is generated by the mobile unit, at least this image is transmitted to the communications device. On the part of the communications device, an image object is selected based on the transmitted image, and a position of this image object is determined. The determined position is transmitted by the communications device to the mobile unit, and the mobile unit marks at least one of the images in such a manner that, starting from at least one of the images, which is taken as a basis for the selection of the image object, and from the position, a location of the selected image object is specified for at least one image to be marked and a marking object is superimposed upon at least one of the images at the position.

20 Claims, 3 Drawing Sheets

(56) References Cited

U.S. PATENT DOCUMENTS

| | | | |
|---|---|---|---|
| 2002/0090068 A1* | 7/2002 | Song | 379/88.13 |
| 2002/0193975 A1 | 12/2002 | Zimmermann | |
| 2003/0022659 A1* | 1/2003 | Mun et al. | 455/415 |
| 2003/0202686 A1* | 10/2003 | Rowe | 382/118 |
| 2004/0086156 A1* | 5/2004 | Furukawa et al. | 382/112 |
| 2004/0131278 A1* | 7/2004 | Imagawa et al. | 382/284 |
| 2004/0207875 A1* | 10/2004 | Endo | 358/1.18 |
| 2005/0162445 A1* | 7/2005 | Sheasby et al. | 345/620 |
| 2006/0150099 A1* | 7/2006 | Laff et al. | 715/708 |
| 2006/0150109 A1* | 7/2006 | Schultz et al. | 715/759 |
| 2006/0188173 A1* | 8/2006 | Zhang et al. | 382/276 |
| 2006/0192776 A1* | 8/2006 | Nomura et al. | 345/419 |

FOREIGN PATENT DOCUMENTS

| | | | | |
|---|---|---|---|---|
| DE | 10 2004 061 842 A1 | 7/2005 | | |
| JP | 2003196382 A * | 7/2003 | | G06F 17/60 |
| WO | WO 01/96906 A1 | 12/2001 | | |

OTHER PUBLICATIONS

Information about NetMeeting, Microsoft, http://www.microsoft.com/windows/NetMeeting/default.ASP (Mar. 3, 2005).

\* cited by examiner

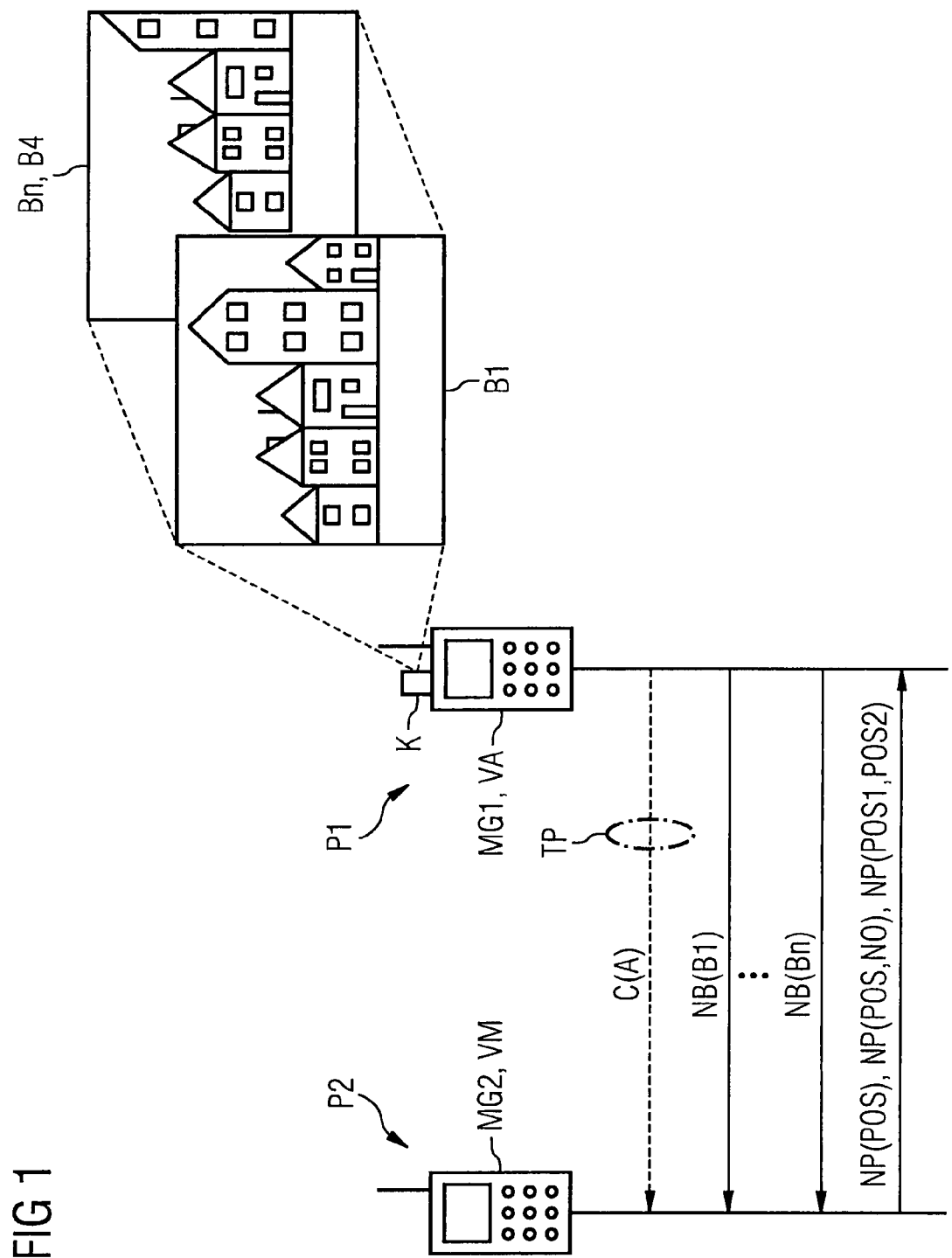

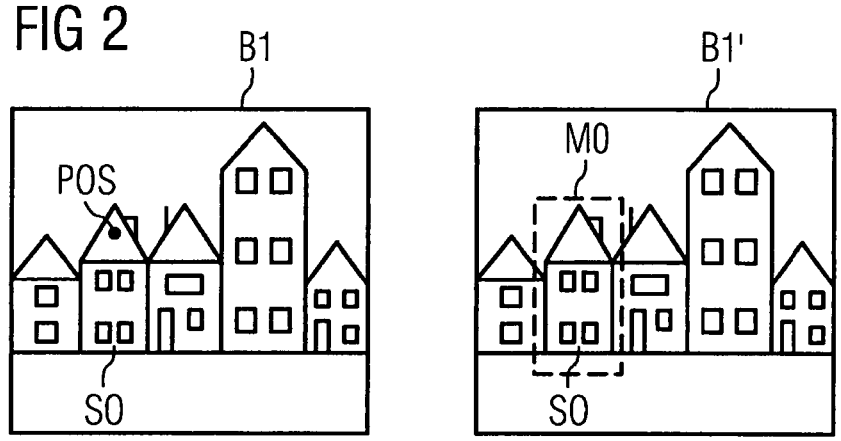
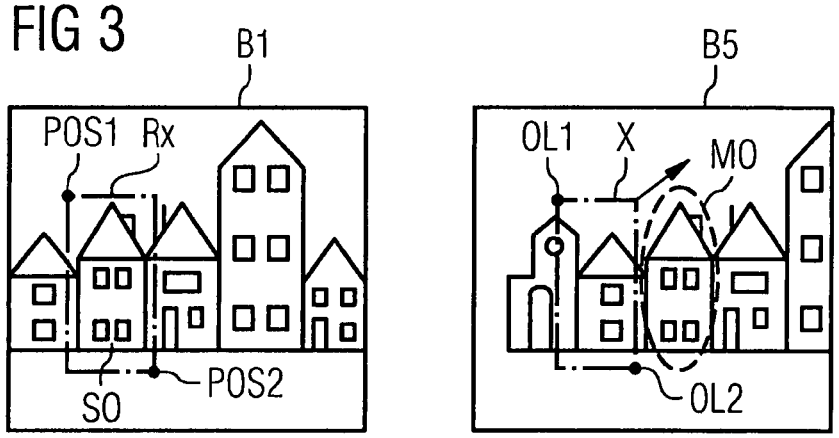
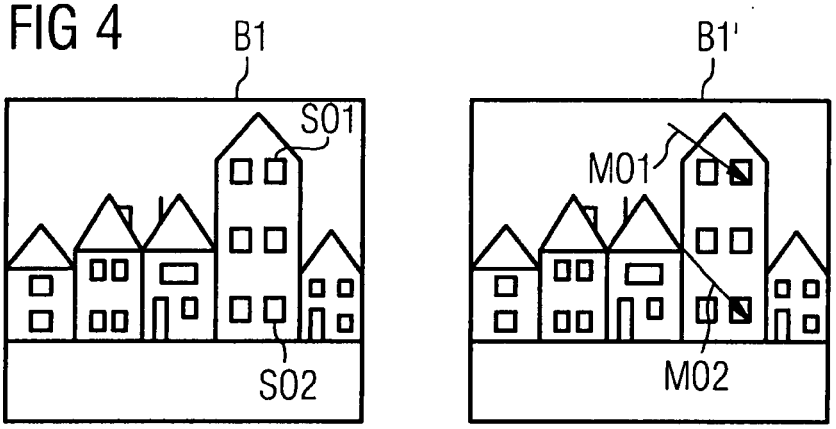

METHOD FOR CARRYING OUT MOBILE COMMUNICATION BY MARKING IMAGE OBJECTS, AND MOBILE UNIT AND COMMUNICATIONS DEVICE

CROSS REFERENCE TO RELATED APPLICATIONS

This application is based on and hereby claims priority to PCT Application No. PCT/EP2006/060327 filed on Feb. 28, 2006 and German Application No. 10 2005 010 030.9 filed on Mar. 4, 2005, the contents of which are hereby incorporated by reference.

BACKGROUND

Voice telephony is mostly used for communication between two persons over a longer distance. Because of ambiguities and problems in understanding human voice, confusion and misunderstandings can arise when discussing complex factual interrelationships. Thus for example the product NetMeeting from Microsoft is known from [1] with which a video conference and a joint processing of software programs are made possible.

One potential object is to specify a method as well as a mobile device and a communications device which allows or allow improved communication between two parties in a call in a simple and reliable manner.

SUMMARY

With the method for mobile communication between a mobile unit and a communications device proposed by the inventors, with voice messages being exchanged by the mobile unit and the communications device by a telecommunication protocol, at least one image is able to be created by the mobile unit, in the case of the creation of at least one image by the mobile unit, at least this image is transferred by the mobile unit to the communications device, an image object is selected on the communications device side on the basis of the image transmitted and a position of this image object is determined, the position determined is transferred by the communications device to the mobile unit, and at least one of the images is marked by the mobile unit such that, using as its starting point at least one of the underlying transferred images used for the selection of the image object and the position a location of the selected image object is specified for at least one image to be marked and a marking object is superimposed on at least one of the images at the position.

The method improves communication between two persons such that instructions or descriptions are given by a marking in at least one image. These instructions or descriptions can also be communicated with and without an additional voice message.

By using the position an efficient selection of the image object and one able to be adapted to different image sizes is obtained. In addition this adaptation to images to be marked is made possible by determining the location.

The superimposing of the marking object in an image to be marked enables the selected image object to be presented for display in the mobile unit. In addition the marking object can be tailored adaptively, such as its shape for example or with a transparent color.

Preferably the chosen position and an identification of the image on which the selection of the image object is based are transmitted by the communications device to the mobile unit. The image for determining the position is thus able to be uniquely identified, i.e. if a plurality of images have been transmitted from the mobile unit to the communications device.

In a preferred expansion a plurality of positions are chosen for at least one image object to be selected. This allows a form of the image object to be selected to be described in a greater level of detail than by a single position. In addition a plurality of image objects can also be defined as well as one image object. Thus for example the members of a family (father, mother and two children) can be shown as individual image objects in a group image of ten, twenty or more people.

If an area of the image describing the selected image object is defined by the at least one chosen position, the image object is able to be determined more precisely in a receive device, i.e. in the mobile unit. Furthermore this enables a detection of the selected image object to be undertaken in at least one image following the transferred image used as a basis for the selection of the image object. This is especially advantageous for image content which changes over time, such as people in a group of people for example.

If in addition or as an alternative an associated location is generated for each of the positions and the image to be marked is overlaid at each location with a marking object respectively, a plurality of image objects can be marked in an image.

Preferably a reference area in the same image which is included for selecting the image object is determined by the mobile unit to determine a location in an image to be marked, an image search area in the image to be marked is defined, the image position of the image search area in the image to be marked is modified until such time as an identity between reference image area and image search area falls below a predeterminable threshold value. In this way an exact determination of the location is guaranteed even when the image object has changed in the image to be marked and in the image included for selection of the image objects.

If in addition the identity is created by an identification number comprising a sum of the squared difference values of the corresponding pixels from the image search area and the reference image area, the search for the exact image position can be performed in a simple manner on a processing unit.

Preferably a wireless transmission standard, especially WLAN (WLAN=Wireless Local Area Network) or GSM (GSM=Global System for Mobile Communications) is used as the telecommunications protocol. This enables the method to be implemented by a standardized transmission protocol in a cost-effective manner.

The inventors also propose a mobile unit with an imaging unit for creating at least one image, a unit for transmitting at least one of the images from the mobile unit to a communications device, a receiver for receiving the chosen position from the communications device and a marking unit to mark at least one of the images, such that, starting from at least one of the transferred images used as a basis for the selection of the image object and the position, a location of the selected image object for at least one image object to be marked is determined and a marking object is superimposed on at least one of the images at the location. The method can be implemented with the mobile unit.

Furthermore the inventors propose a communications device, with a receiver for receiving at least one of the images from the mobile device, a selection unit for selecting an image object on the basis of the transferred image and for determining a position of this image object, and with a transmitter for transmitting the chosen position to the mobile device. The method can be implemented with the communications device.

If the mobile unit and/or the communications device are integrated into a portable unit, especially a unit complying with the WLAN standard and/or GSM standard, these can be implemented in a cost-effective manner.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 a signal flow diagram of the method for exchange of messages between a mobile unit and a communications device;

FIG. 2 a recorded image and an associated marked image;

FIG. 3 two images with which a marking of the image object is undertaken with the aid of an image object tracking method.

FIG. 4 two images, in which two image objects in an image are selected and marked in each case with a marking object;

DETAILED DESCRIPTION OF THE PREFERRED EMBODIMENT

Figure 5:
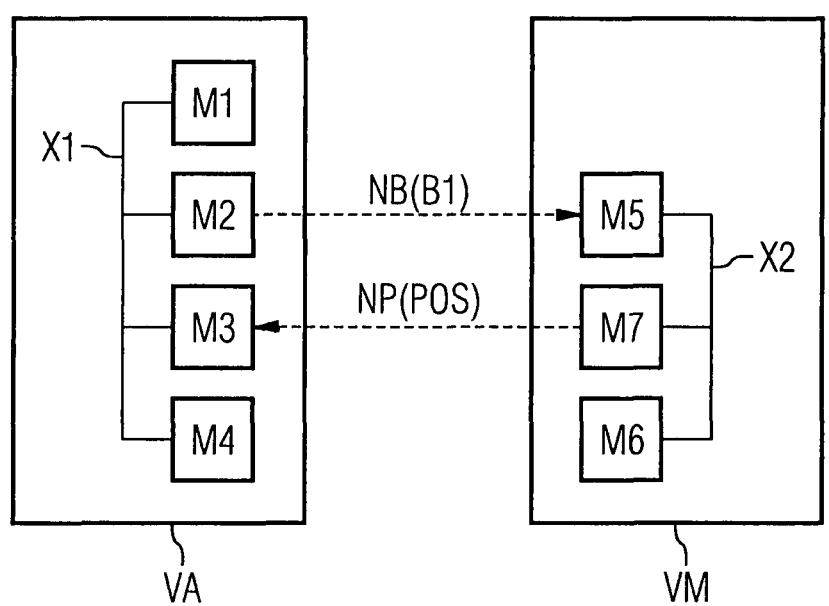
FIG. 5 a layout of the mobile unit and of the communications device respectively.

Reference will now be made in detail to the preferred embodiments of the present invention, examples of which are illustrated in the accompanying drawings, wherein like reference numerals refer to like elements throughout.

An example of the method will be explained in greater detail with the aid of FIG. 1. It is assumed for this example that two people P1, P2 each exchange voice messages by a telephone MG1, MG2 using a telecommunications protocol TP. The relevant telephones are for example embodied as portable telephones, especially as mobile telephones which operate in accordance with the GSM standard (GSM—Global symbols for Mobile Communications), the UMTS standard (UMTS—Universal Mobile Telecommunications system) or the WLAN standard (WLAN—Wireless Local Area Network) for example. Generally the first telephone MG1 is a mobile unit VA and the second telephone MG2 a communications device VM. The voice messages are preferably transmitted in compressed form, with for example the AMR (Adaptive Multi Rate) codec or the ITU G.723.1 codec being used.

Initially these two people P1, P2 communicate with their telephones MG1, MG2 by voice messages. This is indicated in FIG. 1 by the reference symbol C(A). This communication is bidirectional. The first person P1 is located for example in a market place and is looking for a specific house. The second person P2 attempts by a verbal description to describe the house sought to the first person P1. Since the houses are very similar the first person P1 cannot identify the correct house on the basis of the verbal description.

In an alternative embodiment the voice communication can be omnidirectional and the voice messages are actually transmitted from the first telephone MG1 to the second telephone MG2.

In the following explanation the two people P1, P2 use the proposed method to be able to determine the house sought. The mobile unit VA of the first person P1 includes a camera K, with which at least one image B1, . . . , Bn of the houses on the market place is taken. The images will be generated for example after activation by the first person P1. Thereafter at least one of the created images B1 is transferred from the mobile unit VA to the communications device VM. Thus the images can be transmitted with the aid of one or more picture messages NB. To this end for example a specific data connections is established between the mobile unit VA and the communications device VM which is used to exchange the messages needed for execution of the method. It is worthwhile in practice to compress the images, such as B1 for example, before transmission and to decompress them after transmission. In such cases a plurality of compression methods is known, such as JPEG (JPEG—Joint Picture Expert Group) or ITU H.264 video codec for example.

The communications device VM receives at least one of the images B1 and typically displays this on the screen of the communications device VM of the second person P2. The second person P2 selects, with the aid of the keypad for example, the desired image object SO, e.g. the second house from the left in the image B1. A position POS of the desired image object SO is thus known. Selection can be understood as the marking by a point within the image object SO and also the circling of an image object SO. In an alternative embodiment the selection is made automatically by the communications device VM without the second person P2 taking any action. For example the image object to be selected is known to the communications device VM as a result of a stored photograph, so that by comparing the individual houses in the image B1 with the stored photograph of the image object SO the position POS of the sought house can be detected.

The position POS is represented for example by a two-dimensional count value which e.g. specifies the number of pixels measured from the upper left corner of the image B1. Thus for example the position POS={25, 50}. In an alternative the position POS, measured from a reference point such as for example the upper image corner, can be represented as a relative value in relation to image width and image height, such as position POS={12.5%, 50%} for an image width of 200 pixels and an image height of 100 pixels, i.e. 200×100 pixels for example.

After selection of the image object SO the position POS determined is transmitted from the communications device VM to the mobile device VA by a position message NP. If a plurality of positions POS are generated by the communications device VM, these can either be transferred individually or jointly with a position message NP. It is worthwhile in practice compressing the value of the position POS before the transmission, e.g. by a Hufmann method.

In a next step, after receipt of the position message NP a location OL is computed from the position POS. Thus for example the position POS={12.5%, 50%}. The image size of the image B1 comprises a width of 200 pixels and a height of 100 pixels. From this the location OL, i.e. a position in the image to be marked at which the marking object MO is to appear can be calculated. This amounts for example to OL={25, 50} in pixels e.g. for an image to be marked with an image size of 200×100 pixels. If the image size of the image to be marked is 1000×150 pixels the location produced OL={125, 75}. The location OL makes it possible for that image which was taken into account for determining the position POS to have a different size from the image which is to be marked with the marking object MO. Thus, taking into account the transferred image B1 used as a basis for selection of the image object and the position POS, the location OL has been determined.

Subsequently the marking object MO is superimposed on the image B1 at the location OL. The marking object MO can be an arrow which points to the selected image object SO or a border which surrounds the selected image object SO. Furthermore the marking object MO can have a transparent color, so that both the marking and also the marked image object SO remain visible. In the present example the second house from the left in the image B1 is marked by a dashed framework. The original image B1 and the image B1' onto which the marking object MO is superimposed are thus depicted in FIG. 2, with this image being referred to as the marked image B1'. Subsequently the marked image B1' can be presented on a screen of the mobile unit VA of the first person P1.

If a plurality of images B1, . . . , Bn are transmitted by the mobile unit VA to the communications device VM, the communications device can chose one of these images which will be taken into consideration for selection of the image object SO. In the images B1, B2, B3 a specific house is hidden by a passing car. In image B4 this house is visible without anything hiding it. Therefore the communications device VM or its user (person P2) decides to use image B4 for the selection of the image object SO.

To exactly determine the location OL, an identifier NO of the underlying image B4 used for the selection of the image object SO can be transmitted as well as the position POS by the position message NP. This identifier NO is a characteristic value of the image B4, e.g. an image number or a hash sequence obtained from the image B4. The use of the hash sequence is known from encryption technology so that it will not be discussed in any greater detail here. With the aid of the identifier NO the mobile unit VA can determine that image B which has been used as a basis for the selection of the image object SO. This image defined by the identifier NO, e.g. B, and the position POS are also used for creation of the location OL.

Furthermore an image area describing the selected image object SO can be defined by the at least one selected position POS1, POS2. For example in FIG. 3 in the image B1 the second house from the left edge of the image is delimited by a dotted and dashed area of the image. This image area RX is described at its upper left corner by POS1={10%, 40%} and at its lower right corner by POS2={30%, 60%}. The selected image object SO can be marked more exactly in the image to be marked on the basis of the transferred image area RX i.e. in the form of its descriptive positions POS1, POS2, e.g. by a frame MO enclosing the image object SO, such as can be seen for example in the marked image B1' of FIG. 2.

In addition or as an alternative more than one image object SO1, SO2 can also be selected. As can be seen in FIG. 4, two windows of the large house are each selected by an image object SO1, SO2 in the image B1. For each selected image object SO1, SO2 a position POS1, POS2 is transmitted to the mobile unit VA and there a respective location OL1, OL2 for each of the image objects SO1, SO2 is determined. FIG. 4 also depicts the marked image B1' which at the respective location OL1, OL2 shows an associated marking object MO1, MO2. These marking objects MO1, MO2 are in this case depicted in the form of an arrow, with these marking objects MO1, MO2 generally not having to have an identical appearance.

In the previous example or variants the location for the image B1 to be marked has been generated directly from the position POS and at least one of the underlying transferred images B1 used for the selection of the image object SO.

If the transferred image B1 and the image to be marked B5 have been taken at different times, then, especially with different image contents of the images B1, B5, the marking object MO can end up at an incorrect location in the image B5 to be marked. This can be overcome using the following method, with the procedure being explained in greater detail with reference to FIG. 3.

Thus in FIG. 3 image B1 the image object SO to be selected is defined by the positions POS1, POS2. The pixel figures for the positions are for example POS1={20, 40} and POS2={60, 60}. After receipt of these positions POS1, POS2 a reference image area RX is first generated which determines the image area covered by the position POS1, POS2 in the same image B1 as used for selection of the image object SO. Subsequently in the image B5 to be marked, which is not identical to that image B1 which was included for the selection of the image object SO, an image search area X is defined. This image search area X is determined by the location OL1, OL2. The image search area X is shifted pixel-by-pixel over the image B5 to be marked. This procedure is indicated in FIG. 3 image 5 with an arrow. At one or more image positions the image area defined by the image search area X is compared to the reference image area RX. In this case an identity number is computed, which is created for example from the sum of the squared difference values of the corresponding pixels from the image search area X and the reference image area RX. Methods for determining an identity or identity are known from image coding by the term "block scan matching", from [2] or [3]. If the identity number falls below a predeterminable threshold value, then an image area almost identical to the reference image area RX is present at the current image position. This means that the selected image object SO has been found at the current image position. Subsequently at least one marking object MO is superimposed onto the image B5 to be marked.

With this procedure the finding of the image object SO in an image to be marked can be applied to a currently taken image and the marking object MO can be presented together with the taken image. This means that the first person P1, despite variable image content, e.g. through to-and-fro movements of the telephone MG1, can regard the selected image object SO as reliable. This means that a selected image object SO can be traced in real time in its location, the marking object MO is permanently connected so to speak to the object to be selected.

FIG. 5 shows the respective layout of the mobile unit VA and the communications device VM. The mobile unit VA includes the first, second, third and fourth units M1, M2, M3, M4, which are connected to a first connection network X1 for exchange of data and information. The communications device VM includes the fifth, sixth and seventh units M5, M6, M7, which are connected to each other by the second connecting network X2 for exchange of data and information. The mobile unit VA and the communications device VM exchange messages, such as picture messages NB and/or position messages NP for example.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for mobile communication between a mobile unit and a communications device, with voice messages being exchanged between the mobile unit and the communications device using a telecommunication protocol, the method comprising:
   creating an image by the mobile unit;
   transmitting the image from the mobile unit to the communications device;

selecting an image object from the image at the communications device, the image object being a subset of the image;
determining a physical position of the image object on the image, the physical position being determined at the communications device;
transmitting the position from the communications device to the mobile unit; and
superimposing a marking object on the image at the mobile unit based on the position, the marking object being fixed and being superimposed on the image at a second position corresponding to the physical position of the image object.

2. The method as claimed in claim 1, wherein the position is transmitted together an identification of the image from which the image object was selected.

3. The method as claimed in claim 1, wherein a number of positions for the image object are determined.

4. The method as claimed in claim 3, wherein the position defines an image area for the image object.

5. The method as claimed in claim 3, wherein
an associated location is generated for each of the positions,
a marking object is superimposed onto the image at each associated location.

6. The method as claimed in claim 1, wherein,
the mobile unit creates at least a first and a second image,
the first image is transmitted to the communications device,
the marking object is superimposed on the second image, and
to determine the location for the marking object:
a reference image area for the image object is determined in the first image,
an image search area is defined in the second image based on the position,
the reference image area and the image search area are compared, and
the image search area is moved in the second image until such time as an identity between the reference image area and the image search area falls below a predeterminable threshold value.

7. The method as claimed in claim 6, wherein the identity is based on an identity number determined as a sum of differences of corresponding pixels in the image search area and the reference image area.

8. The method as claimed in claim 1, wherein WLAN or GSM is used as the telecommunications protocol.

9. The method as claimed in claim 1, wherein
the mobile unit creates at least a first and a second image,
the first image is transmitted to the communications device, and
the marking object is superimposed on the second image.

10. The method as claimed in claim 9, wherein the position is transmitted together an identification of the image from which the image object was selected.

11. The method as claimed in claim 10, wherein a number of positions for the image object are determined.

12. The method as claimed in claim 11, wherein the position defines an image area for the image object.

13. The method as claimed in claim 12, wherein
an associated location is generated for each of the positions,
a marking object is superimposed onto the image at each associated location.

14. The method as claimed in claim 13, wherein,
the mobile unit creates at least a first and a second image,
the first image is transmitted to the communications device,
the marking object is superimposed on the second image, and
to determine the location for the marking object:
a reference image area for the image object is determined in the first image,
an image search area is defined in the second image based on the position,
the reference image area and the image search area are compared, and
the image search area is moved in the second image until such time as an identity between the reference image area and the image search area falls below a predeterminable threshold value.

15. The method as claimed in claim 14, wherein the identity is based on an identity number determined as a sum of differences of corresponding pixels in the image search area and the reference image area.

16. The method as claimed in claim 15, wherein WLAN or GSM is used as the telecommunications protocol.

17. A mobile unit for voice and data communication with a communications device, the mobile unit comprising:
an imaging device to create an image;
a transmitter to transmit the image from the mobile unit to the communications device;
a receiver to receive a physical position of an image object in the image chosen by the communications device, the image object being a subset of the image; and
a marking unit to mark an image object in the image, the image object being marked based on the physical position, the image object being marked by superimposing a fixed marking object on the image.

18. The mobile unit as claimed in claim 17, wherein
the mobile unit is part of a portable unit, and
the portable unit operates in accordance with the WLAN standard and/or the GSM standard.

19. A communications device for voice and data communication with a mobile unit, the communications device comprising:
a receiver to receive an image from the mobile unit;
a selection unit to select an image object on the image and to determine a physical position of the image object on the image and mark the image object with a fixed marking object, the image object being a subset of the image; and
a transmitter to transmit the physical position to the mobile unit.

20. The communications device as claimed in claim 19, wherein
the communications device is part of a portable unit, and
the portable unit operates in accordance with the WLAN standard and/or the GSM standard.

* * * * *